US010547491B2

United States Patent
Caron (10) Patent No.: US 10,547,491 B2
(45) Date of Patent: Jan. 28, 2020

(54) TRANSCODING WITH A VECTOR PROCESSING UNIT

(71) Applicant: Genband US LLC, Plano, TX (US)

(72) Inventor: Francois Caron, Montreal (CA)

(73) Assignee: GENBAND US LLC, Plano, TX (US)

( * ) Notice: Subject to any disclaimer, the term of this patent is extended or adjusted under 35 U.S.C. 154(b) by 59 days.

(21) Appl. No.: 15/688,531

(22) Filed: Aug. 28, 2017

(65) Prior Publication Data

US 2019/0068431 A1    Feb. 28, 2019

(51) Int. Cl.
*H04L 29/06* (2006.01)
*H04N 19/40* (2014.01)

(52) U.S. Cl.
CPC ....... *H04L 29/06006* (2013.01); *H04N 19/40* (2014.11); *H04L 29/06027* (2013.01)

(58) Field of Classification Search
CPC .......... H04L 29/06006; H04L 29/0602; H04L 29/06027; H04N 19/40; H04N 19/423
See application file for complete search history.

(56) References Cited

U.S. PATENT DOCUMENTS

| 5,629,933 | A  | * | 5/1997  | Delp     | H04L 47/19  |
|           |    |   |         |          | 370/411     |
| 7,616,206 | B1 | * | 11/2009 | Danilak  | G06F 15/16  |
|           |    |   |         |          | 345/505     |
| 9,311,721 | B1 | * | 4/2016  | Loughry  | G06T 1/20   |
| 2004/0167992 | A1 |  | 8/2004 | Carnevale |           |
| 2006/0098730 | A1 | * | 5/2006 | Tsuruta | H04N 19/61  |
|           |    |   |         |          | 375/240.01  |
| 2006/0104351 | A1 | * | 5/2006 | Teng    | H04N 19/172 |
|           |    |   |         |          | 375/240.03  |
| 2007/0286222 | A1 | * | 12/2007 | Balasubramanian | ... H04L 12/12 |
|           |    |   |         |          | 370/412     |
| 2010/0215055 | A1 | * | 8/2010 | Glaser   | G06F 13/124 |
|           |    |   |         |          | 370/469     |
| 2011/0265134 | A1 | * | 10/2011 | Jaggi   | H04N 21/234309 |
|           |    |   |         |          | 725/109     |

(Continued)

OTHER PUBLICATIONS

Varvello et al. "Multilayer packet classification with graphics processing units." In: IEEE/ACM Transactions on Networking. Dec. 5, 2014 (Dec. 5, 2014) Retrieved from http://conferences2.sigcomm.org/co-next/2014/CoNEXT_papers/p109.pdf> entire document.

*Primary Examiner* — Kevin D Mew
(74) *Attorney, Agent, or Firm* — Haynes and Boone, LLP (57) ABSTRACT

A method includes, with a computing system, receiving a plurality of packets for transcoding, the plurality of packets comprising a first set of packets having data in a first format and a second set of packets having data in a second format, with the computing system, placing the first set of packets in a first queue, the first queue comprising packets from more than one communication session, with the computing system, placing the second set of packets in a second queue, the second queue having packets from more than one communication session, with the computing system, processing packets of the first queue with a graphics processing unit, and with the computing system, after processing the packets of the first queue with the graphics processing unit, processing packets of the second queue with the graphics processing unit.

20 Claims, 7 Drawing Sheets

(56) References Cited

U.S. PATENT DOCUMENTS

| | | | |
|---|---|---|---|
| 2011/0317763 A1* | 12/2011 | Takada | H04N 19/423 375/240.13 |
| 2012/0033673 A1* | 2/2012 | Goel | H04L 47/30 370/400 |
| 2012/0147017 A1* | 6/2012 | Hong | H04N 19/439 345/506 |
| 2012/0250512 A1* | 10/2012 | Jagadeeswaran | H04L 47/12 370/235.1 |
| 2013/0308638 A1 | 11/2013 | Grossman | |
| 2013/0310055 A1* | 11/2013 | Dewing | H04L 12/145 455/450 |
| 2014/0369344 A1 | 12/2014 | Sridhar | |
| 2015/0039793 A1* | 2/2015 | Rossetti | H04L 49/90 710/105 |
| 2015/0205757 A1* | 7/2015 | Dally | G06F 8/437 708/200 |
| 2015/0286472 A1* | 10/2015 | Lim | G06F 8/443 717/151 |
| 2017/0075846 A1* | 3/2017 | Krause | G06F 13/4059 |
| 2018/0006970 A1* | 1/2018 | Browne | H04L 12/43 |
| 2018/0032418 A1* | 2/2018 | Wang | G06F 1/3206 |

\* cited by examiner

TRANSCODING WITH A VECTOR PROCESSING UNIT

BACKGROUND

The present disclosure relates generally to transcoding, and more particularly to methods and systems for efficiently performing transcoding tasks between multiple types of communication networks using various communication formats.

Telecommunication technology often involves large processing tasks on substantial quantities of data. For example, when two users are communicating over a telecommunication system, their voice is captured by a microphone and the data representing speech is formatted in a particular manner and placed within packets for transmission over a network. Different components of a telecommunication system may utilize different media formats. Thus, data often is transcoded from one format to another when traversing a telecommunication network. For example, data may be transcoded from a mobile communication codec to a land line codec. Alternatively, data may be transcoded from a mobile communication codec to a Voice over Internet Protocol (VoIP) codec. A particular computing system may handle thousands of communication sessions (e.g., phone calls) simultaneously. Thus, transcoding large amounts of audio data can consume a lot of processing resources.

Telecommunication systems rely on networks nodes, which may be embodied as physical pieces of hardware of virtual systems that bridge two or more types of networks together. Such network nodes may utilize hardware that is specially designed to handle large transcoding tasks. However, it is desirable to use the various resources available to perform the transcoding tasks as efficiently as possible.

SUMMARY

A method includes, with a computing system, receiving a plurality of packets for transcoding, the plurality of packets comprising a first set of packets having data in a first format and a second set of packets having data in a second format, with the computing system, placing the first set of packets in a first queue, the first queue comprising packets from more than one communication session, with the computing system, placing the second set of packets in a second queue, the second queue having packets from more than one communication session, with the computing system, processing packets of the first queue with a graphics processing unit, and with the computing system, after processing the packets of the first queue with the graphics processing unit, processing packets of the second queue with the graphics processing unit.

A method includes, with a network node, receiving a first set of packets from a first endpoint to a second endpoint, the first endpoint connected to the network node through a first type of communication network, the second endpoint connected to the network node through a second type of communication network, with the network node, receiving a second set of packets from the second endpoint to the first endpoint, with the network node, placing the first set of packets in a first queue, with the network node, placing the second set of packets in a second queue, with a vector processing unit associated with the network node, transcoding the first set of packets from a first format associated with the first type of communication network to a second format associated with the second type of communication network, and with the vector processing unit associated with the network node, transcoding the second set of packets from the second format to the first format.

A system includes a processor and a memory with machine readable instructions that when executed by the processor, cause the system to: receive a plurality of packets for transcoding, the plurality of packets comprising a first set of packets having data in a first format and a second set of packets having data in a second format, place the first set of packets in a first queue, the first queue comprising packets from more than one communication session, place the second set of packets in a second queue, the second queue having packets from more than one communication session, process packets of the first queue with a vector processing unit, process packets of the second queue with the graphics processing unit after processing the packets of the first queue with the graphics processing unit.

BRIEF DESCRIPTION OF THE DRAWINGS

Aspects of the present disclosure are best understood from the following detailed description when read with the accompanying figures.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to use the various resources available to perform the transcoding tasks as efficiently as possible. According to principles described herein, a network node within a communication network is responsible for transcoding various simultaneous communication sessions between endpoints in different networks that use different formats. The network node may handle thousands of such simultaneous communication sessions involving several different media formats. For example, one conversation may require transcoding from format A to format B as well as from format B to format A. Another conversation may require transcoding from format A to format C as well as from format C to format A.

In one example, the network node may place all packets into one of a plurality of queues based on the transcoding scenario applicable to each packet. For example, Queue 1 may be for packets to be transcoded from format A to format B. Queue 2 may be for packets to be transcoded from format B to format A. Queue 3 may be for packets to be transcoded from format A to format C. Queue 4 may be for packets to be transcoded from format C to format A. When a particular queue reaches a trigger condition, such as a particular length of time in which the oldest packet has been in the queue, the packets from that queue are sent to a vector processing unit for processing.

An example vector processing unit is specifically designed for processing large quantities of data using vector operations. For example, a vector "add" operation may have two vectors as operands. The resultant vector of the vector "add" operation may have for each position within the vector, a sum of the corresponding positions in the two operand vectors. One example of a vector processing unit is a graphics processing unit (GPU). Graphics processing units are typically designed to perform vector operations on large quantities of data representing images for quick and efficient video processing.

Each of the different queues may be sequentially processed by the vector processing unit. In one example, the data within each packet of the queue being processed is placed into a vector. That vector may then undergo a series of functions in order to transcode the data within the vector from one format to another. The data within the resultant vector may then be placed into outgoing packets that are then transmitted to their respective destinations. The vector processing unit may be configured to process each queue in a predefined manner, such as a round-robin manner.

Figure 1:
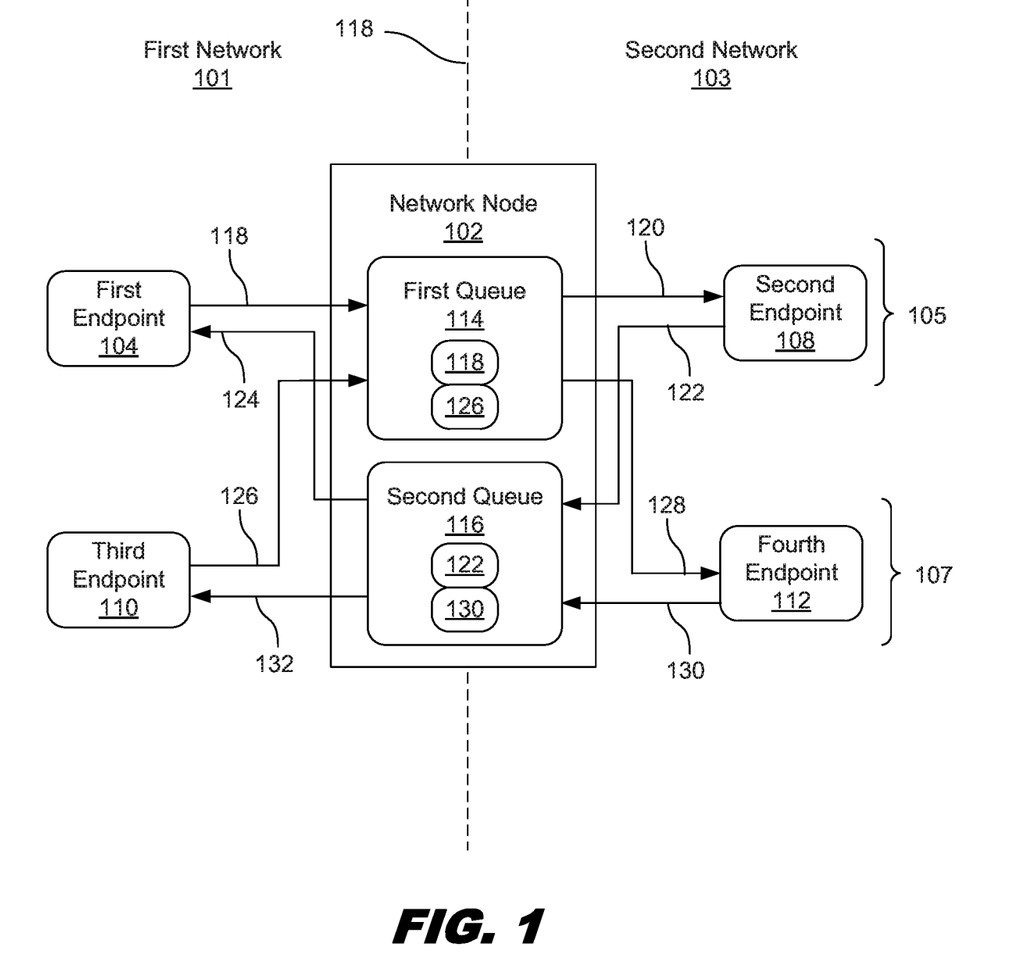
FIG. 1 is a diagram showing transcoding of packets between endpoints in two different networks, according to one example of principles described herein.

FIG. 1 is a diagram showing transcoding of packets between endpoints in two different networks. According to the present example, a network node 102 bridges a first network 101 and a second network 103. The first network 101 and the second network use different media formats. For purposes of explanation, the media format used by the first network 101 will be referred to as format A and the media format used by the second network will be referred to as format B. The network node 102 may be responsible for transcoding data transmitted between the two networks.

In some examples, the network node 102 is a physical server placed within a network. In some examples, the network node 102 may bridge two networks 101, 103. In some examples, the network node 102 may be embodied as a Virtual Network Function (VNF) component in a Network Function Virtualization (NFV) infrastructure. In some examples, the network node 102 may be a Session Border Controller (SBC). In some examples, the network node 102 may be an Advanced Media Software (AMS) component.

The present example illustrates two different communication sessions 105, 107. The first communication session 105 is between a first endpoint 104 in the first network 101 and a second endpoint 108 in the second network 103. The second communication session 107 is between a third endpoint 110 and a fourth endpoint 112. The endpoints 104, 108, 110, 112 may be user devices such as desktop phones, mobile phones, laptop computing devices or desktop computing devices. Other pieces of electronic equipment capable of recording, transmitting, receiving, and displaying audio or video data are also contemplated.

The first communication session 105 involves a set of packets 118 that are transmitted from the first endpoint 104 to the network node 102. These packets 118 hold media data. In the example where the first communication session 105 is a voice communication session, the packets 118 hold data representative of the recorded voice of the user of the first endpoint 104. Because the second endpoint 108 is on a network 103 that uses a different media format, the packets 118 will be transcoded from format A to format B. The network node 102 performs the transcoding process and sends the transcoded packets 120 to the second endpoint 108. Similarly, packets 122 hold data representative of the voice of the user of the second endpoint 108. This data will be transcoded from format B to format A. The network node 102 thus transcodes the data and sends the transcoded data in packets 124 to the first endpoint 104.

The second communication session 107 may be similar to that of the first communication session 105. Particularly, the second communication session 107 involves a set of packets 126 that are transmitted from the third endpoint 110 to the network node 102. These packets 126 hold media data. In the example where the second communication session 107 is a voice communication session, the packets 126 hold data representative of the recorded voice of the user of the third endpoint 110. Because the fourth endpoint 112 is on a network 103 that uses a different media format, the packets 126 will be transcoded from format A to format B. The network node 102 performs the transcoding process and sends the transcoded packets 128 to the second endpoint 108. Similarly, packets 130 hold data representative of the voice of the user of the fourth endpoint 112. This data will be transcoded from format B to format A. The network node 102 thus transcodes the data and sends the transcoded data in packets 132 to the third endpoint 110.

Based on at least the two communication sessions 105, 107 shown, the network node 102 has multiple sets of packets to be transcoded from format A to format B and includes multiple sets of packets to be transcoded from format B to format A. According to the present example, the network node 102 uses different queues to process the different transcoding scenarios. Specifically, the network node 102 uses a first queue 114 to process the packets 118, 126 for transcoding from format A to format B. Additionally, the network node 102 uses a second queue 116 to process the packets 122, 134 transcoding from format B to format A. By dividing the packets into multiple queues, each queue having packets for different transcoding scenarios, the data within each queue can sequentially be sent to the vector processing unit for the transcoding process. In other words, the first queue is sent to the vector processing unit for processing. The vector processing unit then transcodes all the data in the first queue. Then, a second queue is sent to the vector processing unit for processing. The vector processing unit then transcodes all the data in the second queue.

In some examples, the network node 102 may utilize independent buffers for different legs of a particular communication session. For example, the first communication session 105 includes a first leg between the first endpoint 104 and the network node 102. Additionally, the first communication session 105 includes a second leg between the network node 102 and the second endpoint 108. Similarly, the second communication session 107 includes a first leg between the third endpoint and network node 102. Additionally, the second communication session 107 includes a second leg between the network node 102 and the fourth endpoint 112. The packets for independent legs can then be placed into respective queues as described above.

Figure 2:
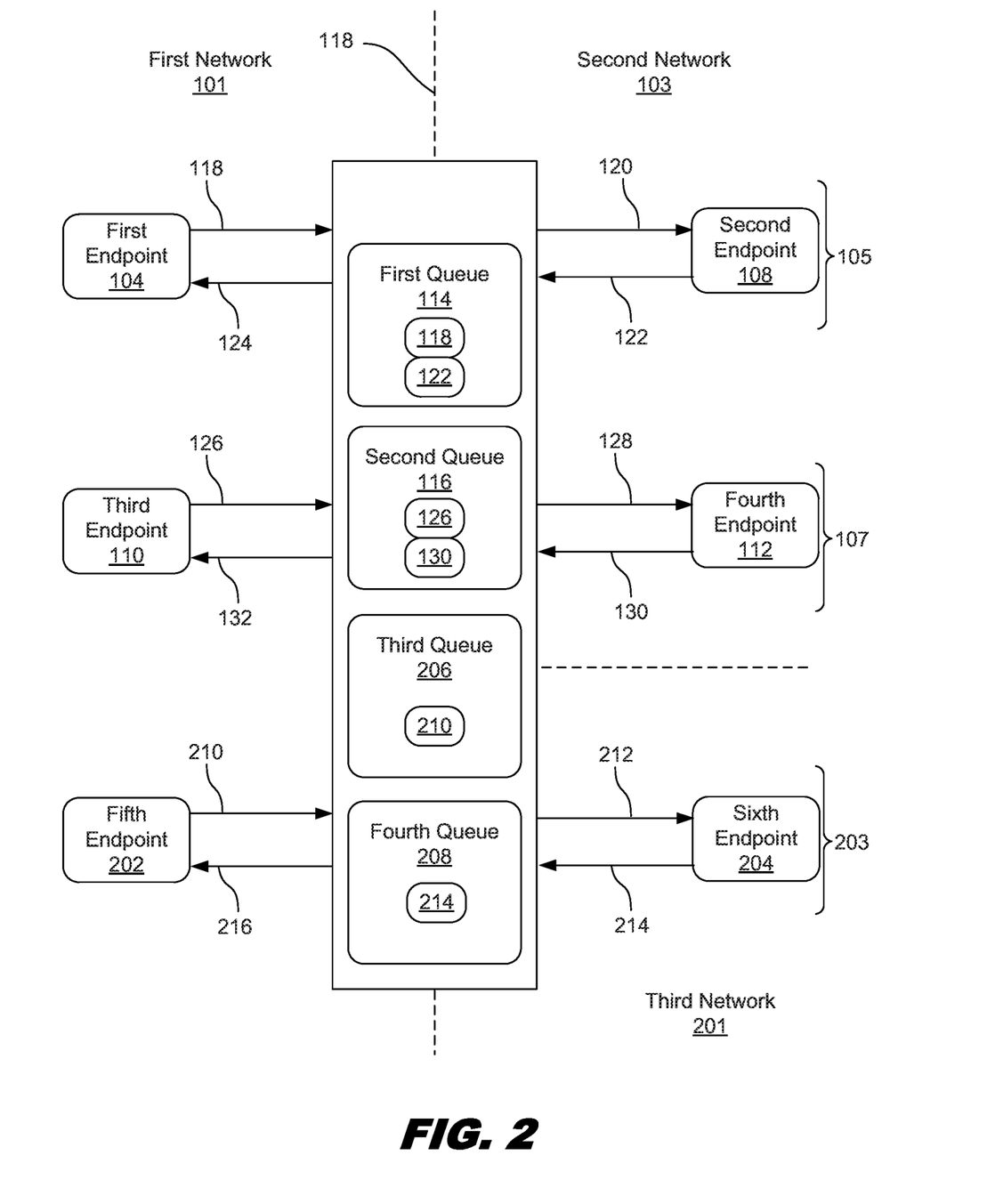
FIG. 2 is a diagram showing transcoding of packets between additional endpoints in additional networks, according to one example of principles described herein.

FIG. 2 is a diagram showing transcoding of packets between additional endpoints in additional networks. According to the present example, the network node 102 provides transcoding for a third communication session 203 between a fifth endpoint 202 and a sixth endpoint 204. The fifth endpoint 202 is in the first network 101 and the sixth endpoint 204 is in a third network 201. In the present example, the third network uses format C.

The third communication session 203 may be similar to that of the first and second communication sessions 105,107. Particularly, the third communication session 203 involves a set of packets 210 that are transmitted from the fifth endpoint 202 to the network node 102. These packets 210 hold media data. In the example where the third communication session 203 is a voice communication session, the packets 210 hold data representative of the recorded voice of the user of the fifth endpoint 202. Because the sixth endpoint 204 is on a network 201 that uses a different media format, the packets 210 are transcoded from format A to format C. The network node 102 performs the transcoding process and sends the transcoded packets 212 to the sixth endpoint 204. Similarly, packets 214 hold data representative of the voice of the user of the sixth endpoint 204. This data will be transcoded from format C to format A. The network node 102 thus transcodes the data and sends the transcoded data in packets 216 to the fifth endpoint 202.

In the present example, the network node 102 uses additional queues 206, 208 for additional transcoding scenarios. Specifically, the third queue 206 is for transcoding packets from format A to format C and the fourth queue 208 is for transcoding packets from format C to format A. Specifically, the third queue 206 is for transcoding the data in packets 210 and the fourth queue 208 is for transcoding the data in packets 214.

The various formats (format A, format B, format C) may be various audio or video codecs associated with different types of communication networks. For example, some audio codecs may include G.711 and G.729. There may be multiple different codecs for different types of communication networks. For example, cellular communication networks may use a variety of audio codecs. VoIP communication networks may use a different set of audio codecs. Conventional landline communication network may packetize transmissions and use particular codecs. When endpoints with different networks communicate with each other, the network node will transcode the data from one codec to another. Additionally, there may be various codecs for similar networks. For example, there may be multiple codecs for cellular networks, or multiple codecs for VoIP networks. Thus, two endpoints may both be on a cellular communication network but may be using different codecs. Thus, there may be situations where two endpoints are on the same network but use different codecs. Thus, communication between such networks would involve a transcoding scenario.

FIGS. 3A-3D are diagrams showing processing of transcoding tasks with a vector processing unit. As described above, each queue is sent to a vector processing unit 304 for processing. In other words, instead of processing the queues on the central processing unit (CPU), the queues are processed by a secondary processing unit, such as the vector processing unit 304. The vector processing unit 304 is designed to process data in vectors. For example, a single processing instruction may be to add one vector to another. In one example, a vector is represented as follows: $[A_1, B_1, C_1, D_1]$. A second vector is represented as follows: $[A_2, B_2, C_2, D_2]$. A vector add function applied to both the first and second vectors may result in the following vector: $[A_1+A_2, B_1+B_2, C_1+C_2, D_1+D_2]$. While the foregoing example shows a vector with only four data points, it is understood that a practical implementation may use much larger vectors. Also, the scope of embodiments is not limited to addition, as various other embodiments may perform any appropriate mathematical operation for vectors on the data.

Before data from the queues 302 is processed by the vector processing unit 304, the data within the packets in a particular queue may be placed into vectors. In some examples, the data point within a vector may correspond to the payload data from one packet. In some examples, the payload data from one packet may be spread out over multiple data points within a vector.

Figure 3A:
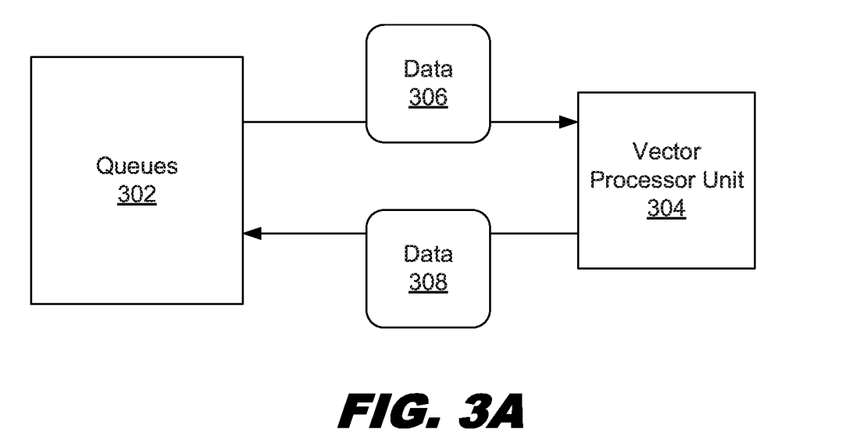
FIGS. 3A-3D are diagrams showing processing of transcoding tasks with a vector processing unit, according to one example of principles described herein.

FIG. 3A illustrates the data within the first queue 114 being sent to the vector processing unit 304. As described above, this is the queue 114 that holds packets 118, 122 to be transcoded from format A to format B. After receiving the data 306 within the packets 118, 122 in a vector format, the vector processing unit 304 applies a series of functions to transcode that data 306 from format A to format B. In some examples, the transcoded data 308 may be sent back to the main CPU in a vector format. The main CPU may then place the transcoded data 308 back into packets 120, 128 for transmission to their destinations (e.g., second endpoint 108 and fourth endpoint 112).

Figure 3B:
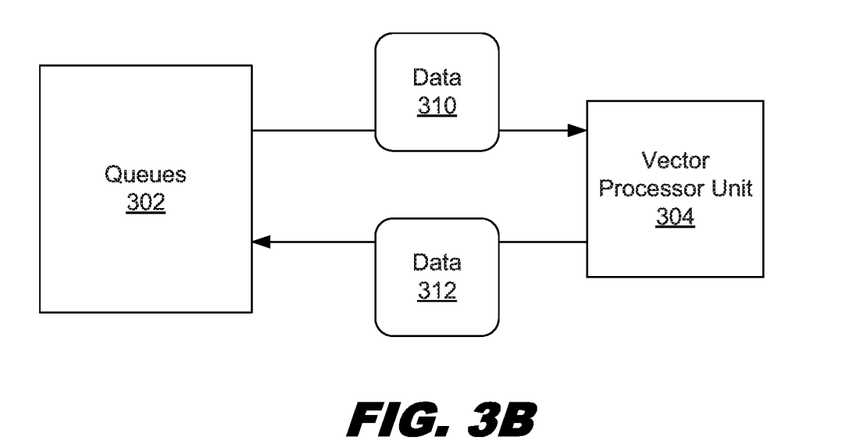

FIG. 3B illustrates the data within the second queue 116 being sent to the vector processing unit 304. As described above, this is the queue 116 that holds packets 126, 130 to be transcoded from format B to format A. After receiving the data 310 within the packets 126, 130 in a vector format, the vector processing unit 304 applies a series of functions to transcode that data 310 from format B to format A. In some examples, the transcoded data 312 may be sent back to the main CPU in a vector format. The main CPU may then place the transcoded data 312 back into packets 124, 132 for transmission to their destinations (e.g., first endpoint 104 and third endpoint 110).

Figure 3C:
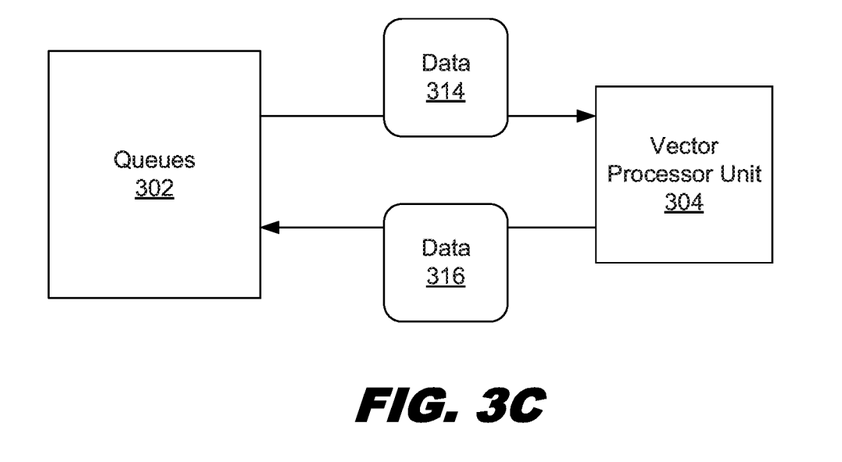

FIG. 3C illustrates the data within the third queue 206 being sent to the vector processing unit 304. As described above, this is the queue 206 that holds packets 210 to be transcoded from format A to format C. After receiving the data 314 within the packets 210 in a vector format, the vector processing unit 304 applies a series of functions to transcode that data 314 from format A to format C. In some examples, the transcoded data 316 may be sent back to the main CPU in a vector format. The main CPU may then place the transcoded data 316 back into packets 212 for transmission to their destination (e.g., sixth endpoint 204).

Figure 3D:
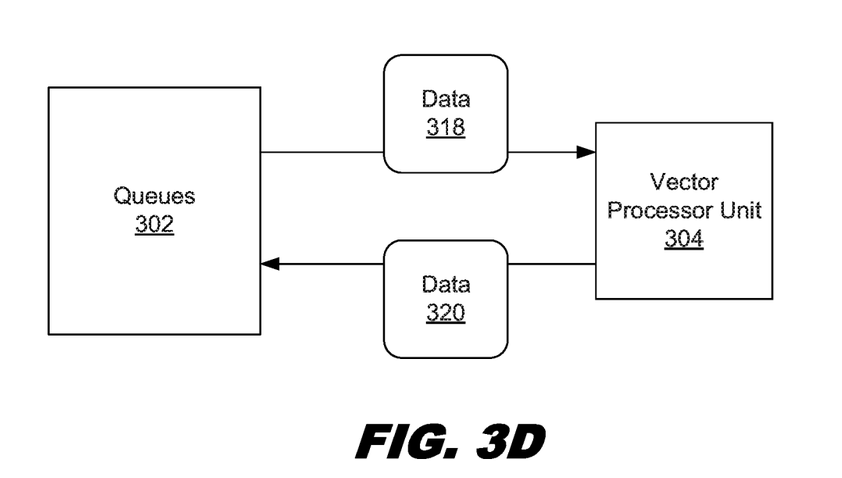

FIG. 3D illustrates the data within the fourth queue 208 being sent to the vector processing unit 304. As described above, this is the queue 208 that holds packets 214 to be transcoded from format C to format A. After receiving the data 318 within the packets 214 in a vector format, the vector processing unit 304 applies a series of functions to transcode that data 318 from format C to format A. In some examples, the transcoded data 320 may be sent back to the main CPU in a vector format. The main CPU may then place the transcoded data 320 back into packets 216 for transmission to their destination (e.g., fifth endpoint 202).

Figure 4:
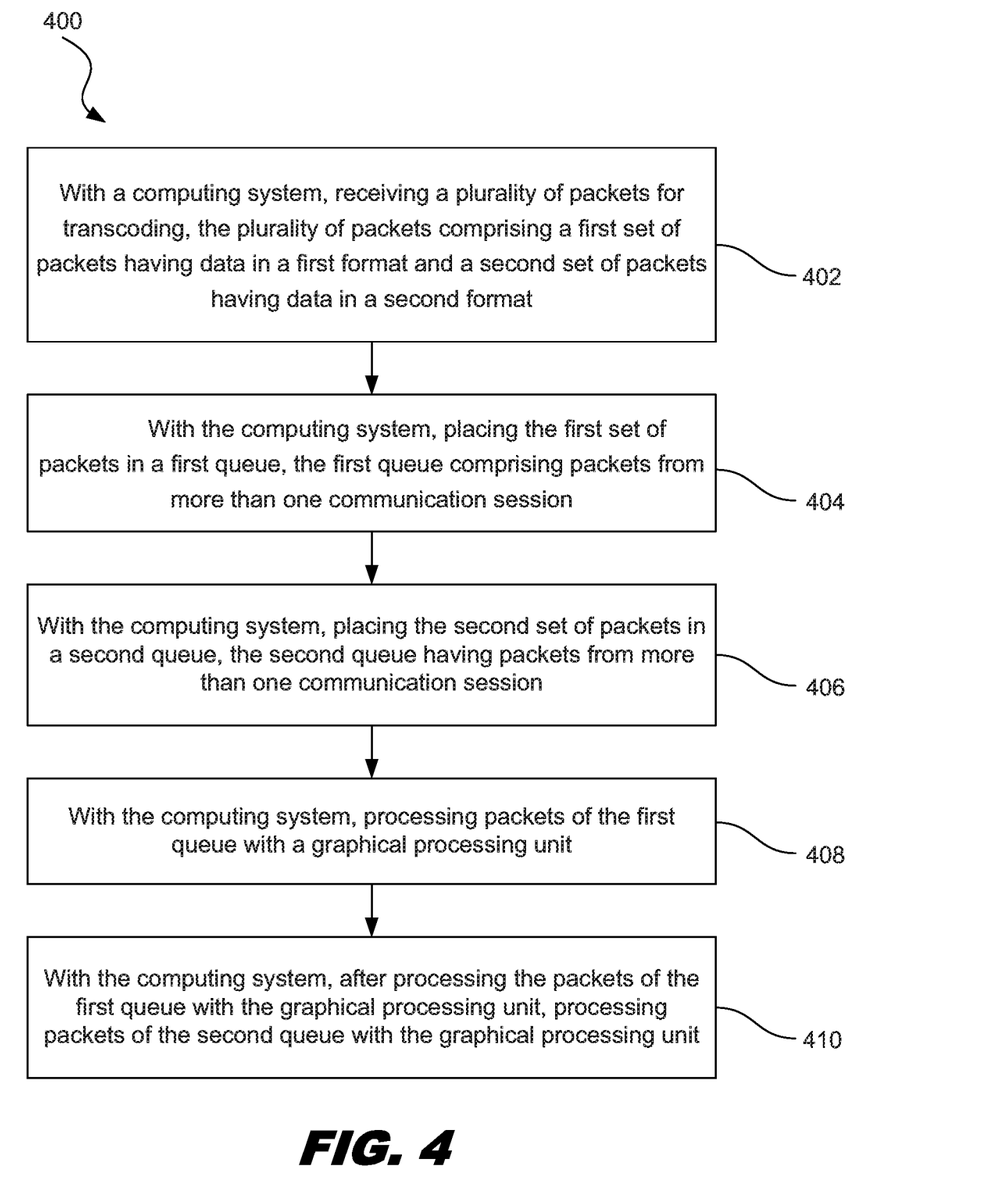
FIGS. 4 and 5 are flowcharts showing illustrative examples of methods for performing transcoding tasks with vector processing units, according to one example of principles described herein.

FIG. 4 is a flowchart showing an illustrative method 400 for performing transcoding tasks with a vector processing unit. Method 400 may be performed in some embodiments by a computing system, such as that shown in FIG. 6. For instance, the various actions may be performed by a main processor or a vector processor in response to executing machine-readable media. In one example, the computing system is configured as a Session Border Controller (SBC) that connects two or more networks. As packets carrying media traverse the computing system from one network to another, the computing system performs transcoding. Method 400 provides one example for transcoding.

According to the present example, the method 400 includes receiving 402 a plurality of packets for transcoding. The plurality of packets includes a first set of packets having data in a first format and a second set of packets having data in a second format. In some examples, the packets in the first format may be received from endpoints in a first communication network that uses the first format for communication. Furthermore, the packets and the second format may be received from endpoints and a second communication network that uses the second format for communication.

According to the present example, the method 400 includes placing 404 the first set of packets in a first queue. The first queue includes packets from more than one communication session. In other words, the first queue may include packets from multiple communication sessions involving communication from the first communication network.

According to the present example, the method 400 includes placing 406 the second set of packets in a second queue. The second queue may include packets from more than one communication session. In other words, the second queue may include packets from multiple communication sessions involving communication from the second communication network.

According to the present example, the method 400 may include processing 408 packets of the first queue with a graphics processing unit. Specifically, the packets may be transcoded from the first format to the second format. In some examples, a different type of processing unit other than the central processing unit may be used. The different type of processing unit may be configured for vector processing.

According to the present example, the method 400 further includes, after processing the packets of the first queue with the graphics processing unit, processing 410 packets of the second queue with the graphics processing unit. In other words, the different queues are processed sequentially. In some examples, the queues may be processed in a round-robin manner. In other words, the system will cycle through each queue for processing by the graphics processing unit. After each queue has been processed, the system may start over with the cycle. In some examples, the cycle may include the same order each iteration. In some examples the order may change for each iteration. In some examples, the order may be randomized. In some examples, the order may be based on the current capacity of each queue. In other words, for each iteration, queues having a greater number of packets waiting for transcoding may be processed before queues having a lesser number of packets waiting for transcoding.

Figure 5:
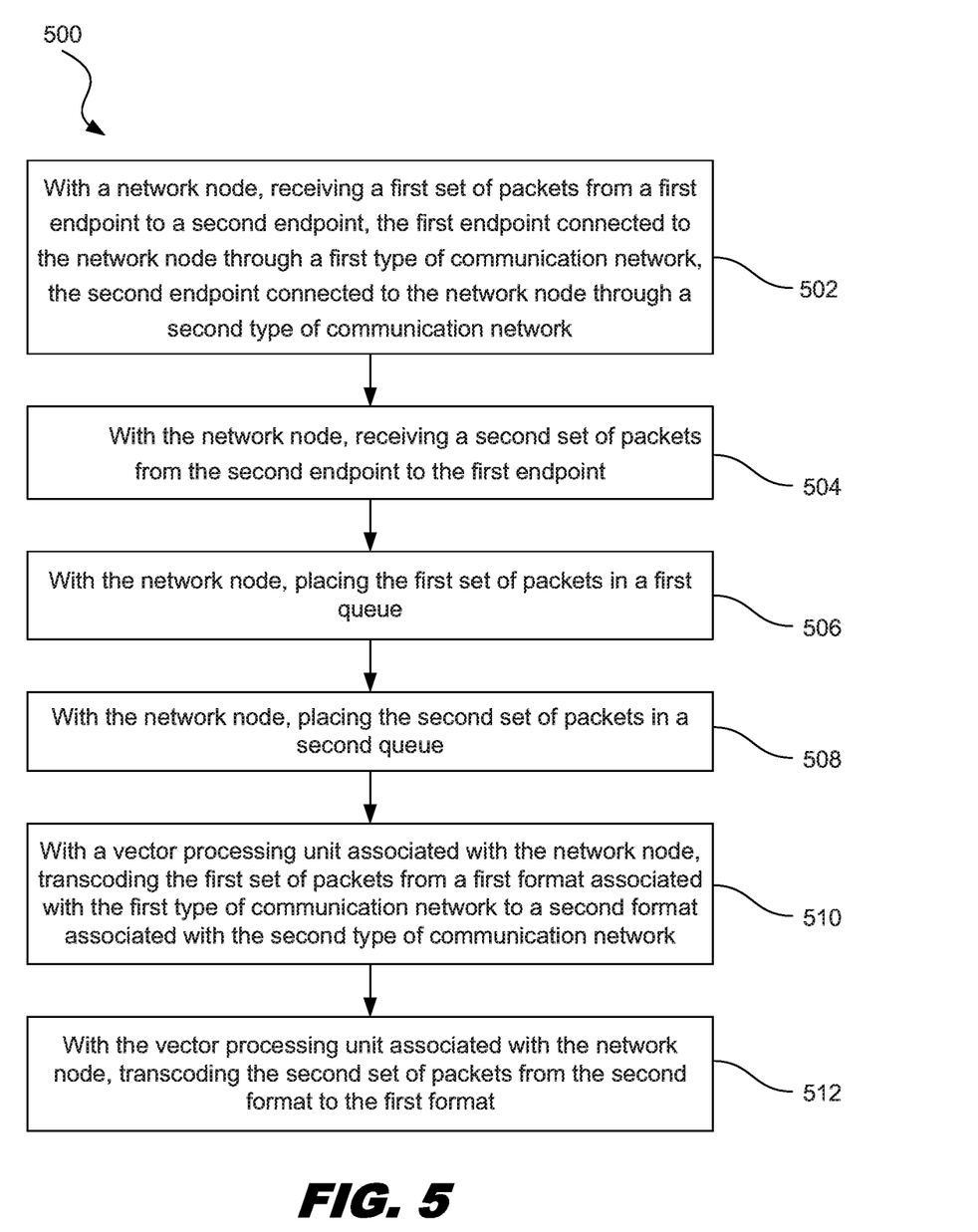

FIG. 5 is a diagram showing an illustrative method 500 for performing transcoding tasks with vector processing units. Method 500 may be performed by a network node configured as an SBC or other appropriate network entity. For instance, the various actions may be performed by a main processor or a vector processor in response to executing machine-readable media. As packets carrying media traverse the node from one network to another, the node performs transcoding. Method 500 provides one example for transcoding.

According to the present example, the method 500 includes receiving 502 a first set of packets being transmitted from a first endpoint to a second endpoint. The first endpoint may be connected to the network node through a first type of communication network. The second endpoint connected to the network node through a second type of communication network. The first type of communication network may utilize a first media format, which will be referred to as format A for discussion purposes. Additionally, the second type of communication network may utilize a second media format, which will be referred to as format B for discussion purposes. The first set of packets is to be transcoded from format A to format B.

According to the present example, the method 500 includes receiving 504 a second set of packets from the second endpoint to the first endpoint. The second set of packets is to be transcoded from the format B to format A.

According to the present example, the method 500 further includes, placing 506 the first set of packets in a first queue. The first queue may include packets from other communication sessions that involve transcoding from format A to format B. The method 500 further includes placing 508 the second set of packets in a second queue. The second queue may also include packets from other communication sessions that involve transcoding from format B to format A.

According to the present example, the method 500 includes, with a vector processing unit associated with the network node, transcoding 510 the first set of packets from a first format associated with the first type of communication network to a second format associated with the second type of communication network. As described above, the transcoding process may involve placing data from the packets into vectors. These vectors are then passed through a series of functions by the vector processing unit to transcode the data within the vectors from one format to another. The transcoded data may then be sent back for processing by the main CPU to be placed back into packets and transmitted to their destinations.

According to the present example, the method 500 includes, with the vector processing unit associated with the network node, transcoding 512 the second set of packets from the second format to the first format. Again, the transcoding process may involve placing data from the packets into vectors. These vectors are then passed through a series of functions by the vector processing unit to transcode the data within the vectors from one format to another. The transcoded data may then be sent back for processing by the main CPU to be placed back into packets and transmitted to their destinations.

The first queue and the second queue may be sent to the vector processing unit sequentially. In some examples, either the first queue or the second queue is sent when a trigger condition is reached. For example, a queue may reach a particular capacity. Alternatively, a queue may have a packet therein that has been in the queue for more than a predetermined period of time. Furthermore, as described above, a set of queues may be processed in a round-robin manner.

The various embodiments are not limited to the series of actions described above as methods 400 and 500. Other embodiments may add, omit, rearrange, or modify one or more actions. For instance, various embodiments may perform the actions of method 400 or method 500 continually during operation to provide transcoded media from one network to another. Also, although not illustrated in detail in FIGS. 4 and 5, it is understood that various embodiments may include receiving packets having media information according to a first codec and, after transcoding, transmitting packets having media information according to a second codec on a second network. In other words, a given packet having media information may originate at a first endpoint, traverse multiple networks and one or more nodes performing transcoding, to be delivered to a second endpoint.

By using the graphics processor to transcode data, large amounts of data can be processed more efficiently. Specifically, because similar transcoding scenarios involve the same functions applied to the data, large amounts of data in vectors can be processed using a single instruction. Specifically, a single processor instruction may apply a particular operation to each data point within a vector. Providing for more efficient transcoding function allows server systems such as network node 102 to process larger amounts of data in a smaller amount of time, leading to improved call quality and capacity.

Figure 6:
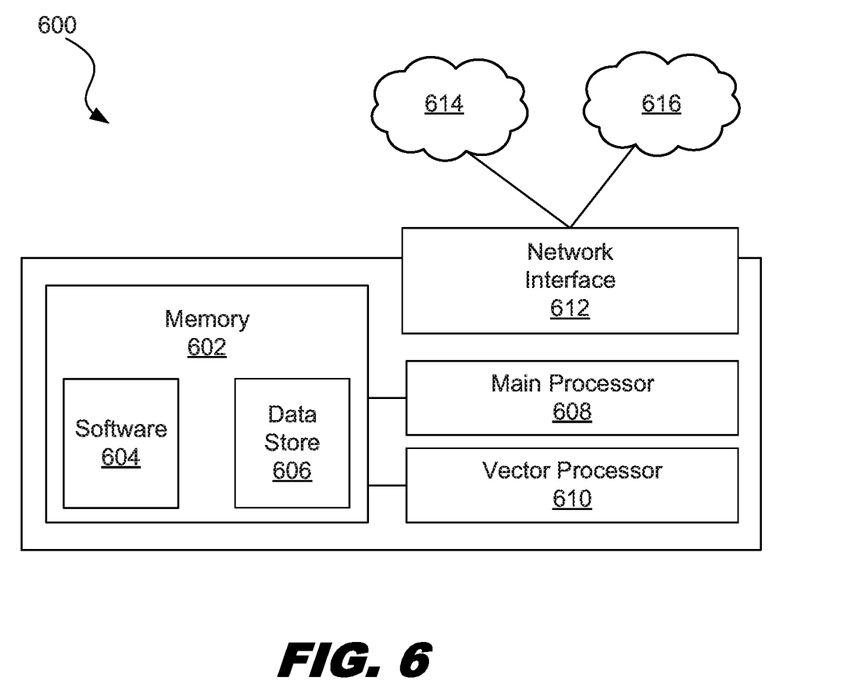
FIG. 6 is a diagram showing an illustrative computing system that may be used to perform transcoding tasks with a vector processing unit, according to one example of principles described herein.

FIG. 6 is a diagram showing an illustrative computing system 600 that may be used to perform transcoding tasks with a vector processing unit. For example, the computing system 600 may correspond to the network node 102 described above. The tasks performed by the computing system 600 may include those described above in the text accompanying FIGS. 4-5. According to certain illustrative examples, the computing system 600 includes a memory 604 which may include software 606 and a data store 608. The computing system 600 also includes a main processor 608, a vector processor 610, and a network interface 612.

The memory 602 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 604 and data in the data store 606. In some examples, the queues described above The computing system 600 also includes a main processor 608 for executing the software 604 and using or updating the data stored in memory 604. The software 604 may include an operating system and any other software applications that may be used to manage communication sessions between networks 614, 616. The software 604 may include machine readable instructions of a computer program product that when executed, perform the functions described above in accordance with the text accompanying FIGS. 4-5.

The vector processor 610 may be, for example, a graphics processing unit. Graphics processing units are generally designed to process large quantities of data with a single instruction. Thus, the graphics processing unit may be well suited towards processing large sets of data that are to be transcoded from one format to another. The data within each vector processed by the graphics processing unit may be associated with multiple communication sessions.

The network interface 612 may include hardware and software that allows the computing system 600 to communicate with other processing systems over networks 614, 616. For example, network 614 may use one media format and network 616 may use a different media format. The network interface 612 may be designed to communicate with the networks 614, 616 through hardwire media such as Ethernet, coaxial, fiber-optic, etc. The network interface 612 may also be designed to communicate with the networks 614, 616 using wireless technologies.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for transcoding media, the method performed by a computing system, the method comprising:
receiving a plurality of packets for transcoding, the plurality of packets comprising a first set of packets from a first telecommunication network, the first set of packets having data in a first codec and a second set of packets from a second telecommunication network, the second set of packets having data in a second codec, the second codec being different than the first codec;
placing the first set of packets in a first queue, the first queue comprising packets from more than one communication session;
placing the second set of packets in a second queue, the second queue having packets from more than one communication session;
transcoding packets of the first queue with a graphics processing unit;
after transcoding the packets of the first queue with the graphics processing unit, transcoding packets of the second queue with the graphics processing unit; and
transmitting transcoded packets to respective destinations between the first telecommunication network and second telecommunication network.

2. The method of claim 1, wherein the first set of packets includes packets being transmitted from a first endpoint to a second endpoint, and wherein the second set of packets includes packets being transmitted from the second endpoint to the first endpoint.

3. The method of claim 1, wherein the graphics processing unit applies a series of functions to the packets of the first queue to transcode data in the packets of the first queue from the first codec to the second codec.

4. The method of claim 1, wherein the graphics processing unit applies a series of functions to the packets of the second queue to transcode data in the packets of the second queue from the second codec to the first codec.

5. The method of claim 1, wherein the graphics processing unit uses a single vector instruction to perform a single process to multiple data points within a vector.

6. The method of claim 1, wherein the first codec comprises one of: a landline codec, a mobile phone codec, and a Voice over Internet Protocol (VoIP) codec.

7. The method of claim 1, further comprising, placing additional sets of packets in additional queues, each additional queue being associated with a different codec.

8. The method of claim 7, further comprising, serially processing packets in each of the first queue, the second queue, and the additional queues with the graphics processing unit.

9. The method of claim 8, wherein serially processing the packets is performed in a round-robin manner with respect to the first queue, the second queue, and the additional queues.

10. A method for transcoding media, the method performed by a network node, the method comprising:
receiving a first set of packets from a first endpoint to a second endpoint, the first endpoint connected to the network node through a first type of communication network, the second endpoint connected to the network node through a second type of communication network;
receiving a second set of packets from the second endpoint to the first endpoint;
placing the first set of packets in a first queue;
placing the second set of packets in a second queue;
with a vector processing unit associated with the network node, transcoding the first set of packets from a first codec associated with the first type of communication network to a second codec associated with the second type of communication network, the first codec being different than the second codec;
with the vector processing unit associated with the network node, transcoding the second set of packets from the second codec to the first codec; and
transmitting processed packets to respective destinations between the first type of communication network and second type of communication network.

11. The method of claim 10, wherein the first queue includes packets from a third endpoint associated with the first type of communication network to a fourth endpoint associated with the second type of communication network.

12. The method of claim 11, wherein the second queue includes packets from the fourth endpoint destined for the third endpoint.

13. The method of claim 10, wherein the vector processing unit is a graphics processing unit.

14. The method of claim 10, wherein the first codec comprises one of: landline codec, a mobile phone codec, and a Voice over Internet Protocol (VoIP) codec.

15. The method of claim 10, wherein the vector processing unit applies a series of functions to the packets of the first queue to transcode data in the packets of the first queue from the first codec to the second codec.

16. The method of claim 10, further comprising, placing additional sets of packets in additional queues, each additional queue being associated with a different transcoding scenario.

17. The method of claim 16, further comprising, serially processing packets in each of the first queue, the second queue, and the additional queues with the vector processing unit in a round-robin manner.

18. A system comprising:
a processor; and
a memory with machine readable instructions that when executed by the processor, cause the system to:
receive a plurality of packets for transcoding, the plurality of packets comprising a first set of packets having data in a first codec and a second set of packets having data in a second codec, the first codec being different than the second codec, the first set of packets being from a first telecommunication network that uses the first codec and the second set of packets being from a second telecommunication network that uses the second codec;
place the first set of packets in a first queue, the first queue comprising packets from more than one communication session;
place the second set of packets in a second queue, the second queue having packets from more than one communication session;
transcode packets of the first queue with a vector processing unit;
transcode packets of the second queue with the vector processing unit after transcoding the packets of the first queue with the vector processing unit; and
transmit transcoded packets to respective destinations between the first telecommunication network and second telecommunication network.

19. The system of claim 18, wherein the system comprises a physical server in a communication network.

20. The system of claim 18, further comprising a Virtual Network Function (VNF) component executed by the processor to execute the machine readable instructions.

* * * * *